United States Patent
Wood

(10) Patent No.: US 9,944,126 B2
(45) Date of Patent: Apr. 17, 2018

(54) FUEL EFFICIENCY SYSTEM FOR A VEHICLE

(71) Applicant: Richard Bryan Wood, Denton, TX (US)

(72) Inventor: Richard Bryan Wood, Denton, TX (US)

(73) Assignee: PACCAR Inc, Bellevue, WA (US)

( * ) Notice: Subject to any disclaimer, the term of this patent is extended or adjusted under 35 U.S.C. 154(b) by 504 days.

(21) Appl. No.: 14/605,743

(22) Filed: Jan. 26, 2015

(65) Prior Publication Data

US 2016/0214434 A1    Jul. 28, 2016

(51) Int. Cl.
| | |
|---|---|
| *B60C 5/20* | (2006.01) |
| *B60C 5/22* | (2006.01) |
| *B60C 17/04* | (2006.01) |
| *B60C 19/00* | (2006.01) |
| *B60C 23/00* | (2006.01) |
| *B60C 17/01* | (2006.01) |
| *B60C 5/02* | (2006.01) |

(52) U.S. Cl.
CPC .................. *B60C 5/22* (2013.01); *B60C 5/02* (2013.01); *B60C 17/01* (2013.01); *B60C 19/00* (2013.01); *B60C 23/001* (2013.01); *B60C 23/003* (2013.01)

(58) Field of Classification Search
CPC ....... B60C 17/00; B60C 17/04; B60C 17/044; B60C 19/00
See application file for complete search history.

(56) References Cited

U.S. PATENT DOCUMENTS

| | | | |
|---|---|---|---|
| 2,981,305 | A | 4/1961 | Reed |
| 3,557,859 | A | 1/1971 | Brenhouse |
| 3,971,425 | A | 7/1976 | Tsuruta |
| 4,570,691 | A | 2/1986 | Martus |
| 5,629,873 | A | 5/1997 | Mittal |
| 5,647,927 | A | 7/1997 | Mason |
| 6,098,682 | A | 8/2000 | Kis |
| 8,176,958 | B2 | 5/2012 | Rodenbeck |
| 2004/0003865 | A1 | 1/2004 | Skoff |

(Continued)

FOREIGN PATENT DOCUMENTS

| | | | |
|---|---|---|---|
| CN | 101362422 | * | 2/2009 |
| CN | 101927667 A | | 12/2010 |

(Continued)

OTHER PUBLICATIONS

Alexander, M., et al., "Dynamically-Self-Inflating Tire System," Final Report, Analytical Product Design—Fall 2006, Team #7 (APD Jul. 2006), Department of Mechanical Engineering, University of Michigan, Ann Arbor, Dec. 12, 2006, 63 pages.

(Continued)

*Primary Examiner* — Justin R Fischer
(74) *Attorney, Agent, or Firm* — Christensen O'Connor Johnson Kindness PLLC

(57) ABSTRACT

Vehicle systems and components are set forth, which aim to reduce rolling friction caused in part by the contact between the vehicle's tires and the ground surface over which the vehicle is traversing. These systems and/or components thereof may increase the overall fuel efficiency of a vehicle. In the examples provided, the systems and/or components change the tread contact patch of one or more tires during movement of the vehicle.

17 Claims, 4 Drawing Sheets

(56) References Cited

U.S. PATENT DOCUMENTS

2007/0044881 A1    3/2007  Skoff
2009/0008010 A1    1/2009  Hirs
2012/0221196 A1    8/2012  Seymour

FOREIGN PATENT DOCUMENTS

| CN | 102922963 A | | 2/2013 |
|----|-------------|---|--------|
| JP | 3-281405 A | | 12/1991 |
| JP | 2719323 | * | 2/1998 |
| JP | 2007-320405 | * | 12/2007 |
| WO | WO 2005/095172 | * | 10/2005 |
| WO | 2013/114388 A1 | | 8/2013 |

OTHER PUBLICATIONS

Amlin, E. And Bradley, A.H., "Variable Tyre Pressure Control for Log-Hauling Vehicles," in D. Cebon and C.G.B. Mitchell (eds.) "Heavy Vehicles and Roads: Technology Safety and Policy," Proceedings of the 3rd International Symposium on Heavy Vehicle Weights and Dimensions (HVWD3) ,Cambridge, UK, 1992, pp. 439-441.

* cited by examiner

FUEL EFFICIENCY SYSTEM FOR A VEHICLE

BACKGROUND

A vehicle's fuel economy is the result of its total resistance to movement. This includes overcoming inertia, driveline friction, road grades, tire rolling resistance and air drag. The relative percent of influence that these factors represent during stop-and-go city driving are very different from steady, state highway driving.

To improve the fuel efficiency in the transportation industry, various approaches have been employed in order to reduce the rolling resistance of a vehicle tire. Generally described, some of these methods include the utilization of harder material or employment of greater inflation pressures in order to achieve lower rolling resistance.

The transportation industry is continuously looking for ways to improve fuel efficiency of a vehicle by reducing rolling resistance. The disclosed subject matter aims to provide such a system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an embodiment of the present disclosure, a system is provided for improving the fuel efficiency of a vehicle. The system includes at least one wheel composing of a tire mounted to a rim and forming an inner cavity. The tire includes sidewalls that extend outwardly from the rim to shoulders that are interconnected via a tread at a crown area of the tire. The system also includes a linear actuator positioned within the inner cavity of the tire. In one embodiment, the linear actuator is configured to be in contact with the rim at one end and the tire at the other end. The system also includes a power storage source configured to store power. The power storage source is selectively connected to the linear actuator. The system further includes a controller configured to selectively supply power from the power storage source to the linear actuator in order to extend the linear actuator in such a manner as to lengthen the side walls of the tire and to reduce the amount of tread that contacts the ground.

In accordance with an embodiment of the present disclosure, a system is provided for improving the fuel efficiency of a vehicle. The system includes first and second wheels each comprising a tire mounted to a rim and forming an inner cavity. The tire includes sidewalls that extend outwardly from the rim to shoulders that are interconnected via a tread at a crown area of the tire. The system also includes a linear actuator positioned within the inner cavity of each tire such that the linear actuator contacts the rim at one end and the tire at the other end, wherein the linear actuator is configured to apply opposite forces again the tire and the rim as the linear actuator actuates between a normal state and an extended state. The system also includes a power storage source configured to store power. The power storage source is selectively connected to the linear actuator. The system further includes a controller configured to selectively supply power from the power storage source to the linear actuator in response to signals from one or more sensors in order to transition the linear actuator from the normal state to the extended state, wherein the transition from the normal state to the extended state of the actuator in one embodiment lengthens the side walls of the tire and reduces the amount of tread that contacts the ground.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
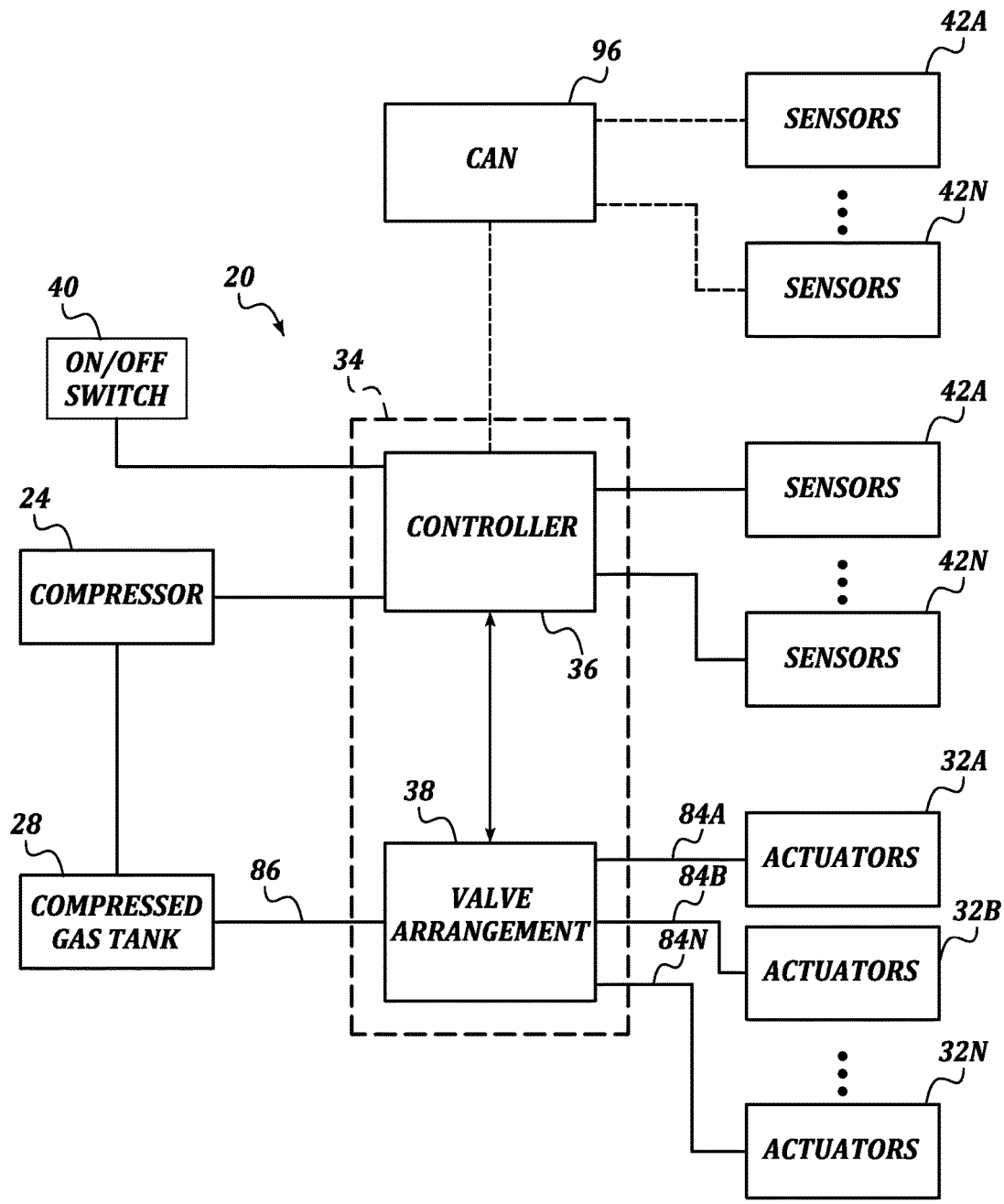
FIG. 1 is a schematic diagram of one example of a fuel efficiency system in accordance with aspects of the present disclosure.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion proceeds with reference to examples of fuel efficiency systems suitable for use with vehicles, such as Class 8 trucks and/or trailers. Generally described, representative examples of the systems and components described herein aim to reduce rolling friction caused in part by the contact between the vehicle's tires and the ground surface over which the vehicle is traversing. As such, the systems and/or components thereof may increase the overall fuel efficiency of a vehicle. In the examples disclosed herein, the system changes the tread contact patch of each tire during movement of the vehicle. In some embodiments, the system can be activated after the vehicle has attained a minimum threshold speed (e.g., 45 mph or greater). Additionally or alternatively, some embodiments of the system prohibit activation of the system if the vehicle has attained a maximum threshold speed (e.g., 75 mph or greater). Further, in some embodiments, the system can transition from its activated state to its unactivated state if the operator of the vehicle engages a particular system on the vehicle, such as, for example, application of the vehicle brakes.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order to not unnecessarily obscure various aspects of the present disclosure. Further, it will be appreciated that embodiments of the present disclosure may employ any combination of features described herein.

Although representative embodiments of the present disclosure is described with reference to Class 8 trucks, it will be appreciated that aspects of the present disclosure have wide application, and therefore, may be suitable for use with many types of powered vehicles, such as passenger vehicles, buses, RVs, commercial vehicles, light and medium duty vehicles, and the like, as well as non-powered vehicles, such as trailers and the like. Accordingly, the following descriptions and illustrations herein should be considered illustrative in nature, and thus, not limiting the scope of the claimed subject matter.

Turning now to FIG. 1, there is shown a schematic diagram of one example of a fuel efficiency system, generally designated 20, in accordance with aspects of the present disclosure. As shown in FIG. 1, the system 20 includes a gas compressor 24, a power storage source, such as an accumulator or compressed gas tank 28 charged by the gas compressor 24, one or more of linear actuators 32 associated with each tire of the vehicle, and a control unit 34, comprised of, for example, a controller 36 and a valve arrangement 38, that selectively controls the actuation of the plurality of linear actuators 32.

The system 20 can include a manual input, such as an on/off switch 40, for activating/deactivating the system 20, or the system 20 can be activated and/or deactivated upon receipt of suitable control signals from another vehicle controller or from one or more vehicle sensors 42A-N. The one or more sensors 42A-N in some embodiments are configured to measure/determine, for example, one or more of vehicle speed, vehicle acceleration, vehicle yaw, vehicle roll, vehicle braking, etc. In use, activation of the system 20 reduces the effective contact surface of the tires with the ground, referred to herein the tire patch or ground contact patch. Deactivation of the system returns the tires from the narrower contact patch shown in the activated state of FIG. 3 to their normal shape with a wider contact patch, as shown in FIG. 2.

Figure 2:
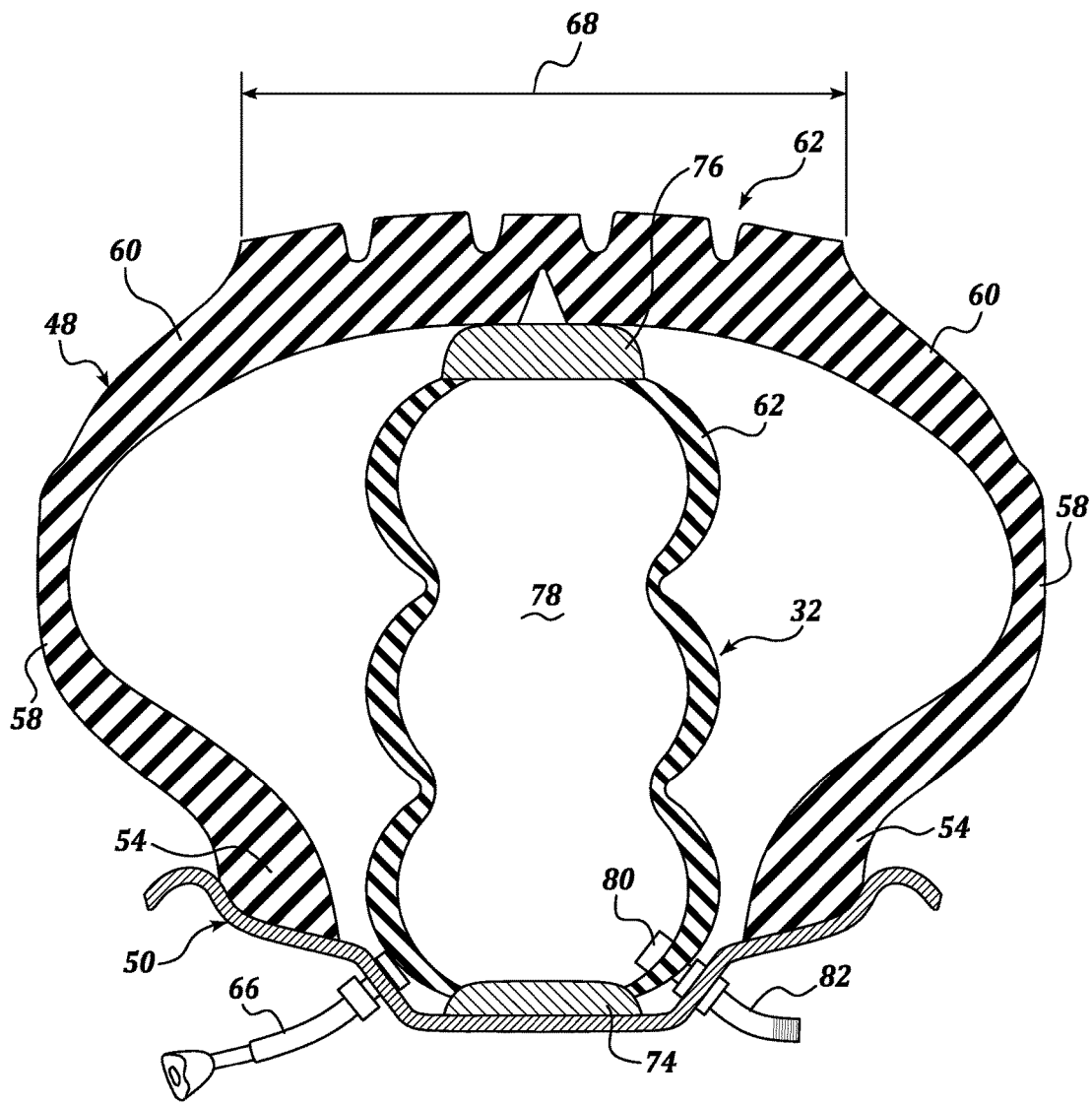
FIG. 2 is a cross sectional view of a tire and hub combination incorporating components of the fuel efficient system of FIG. 1, the tire and hub combination in a normal state.

FIG. 2 is a partial cross-sectional view of a wheel 46 for a vehicle that incorporates one or more components of the system 20. As shown in FIG. 2, the wheel 46 includes a tubeless tire 48 mounted on a rim 50. In the embodiment shown, the tire 48 includes left and right beads 54 that interface with flange sections of the rim 50 in a conventional manner, side walls 58 that extend outwardly from the beads 54 to shoulders 60, and a tread 62 that interconnects the shoulders 60 at the crown area of the tire 48. It will be appreciated that the tire 48 may include many other conventional components, including but not limited to an inner liner, belts, plies, and the like. The tread 62 can have any known or future developed tread pattern, and can be chosen at least in part based on its intended application. Once inflated with air via its conventional inflation valve 66 to an acceptable pressure, for example, as suggested by the tire's manufacturer, and supporting the weight of the associated vehicle, the tread 62 assumes its "normal" contact patch 68, as shown in FIG. 2.

In accordance with an aspect of the present disclosure, at least one linear actuator 32 of the system 20 is disposed within the interior cavity 70 of the tire 48 when the tire is mounted to the rim 50. In the embodiment shown, the linear actuator 32 includes an expandable bag or bellows 72 that extends circumferentially around the rim 50. The bellows 72 is sealed at its inner and outer ends via inner and outer bead plates 74 and 76, thereby defining a gas sealed cavity 78. When installed, the inner plate 74 contacts the central section of the rim 50 and the outer plate 76 contacts the inside of the tire 48 below the tread 62. In some embodiments, the plates 74 and 76 may be optionally secured to the rim 50 and tire 48, respectively, via chemical fastening techniques, among others. In other embodiments, only the inner plate 74 is secured to the rim 50 while the outer plate is maintain in place against the tire 48 based on, for example, the height and/or rigidity of the bellows assembly.

The bellows 72 is constructed out of a stretchable but sturdy material, such as natural or synthetic rubber, elastomeric polymers, a rubber and polyurethane composite, etc. The bellows 72 is configured with stiff sidewalls so that the bellows 72 is primary expandable lengthwise in order to apply opposite forces against the tire 48 and rim 50. In some embodiments, the sidewalls of the bellows may be stiffened by reinforcement means, such as belts, ribs, springs or bands, etc., of steel, Kevlar, etc. In other embodiments, the bellows 72 is stiffened in the appropriate regions by engineering the elastomeric matrix. In one embodiment, the bellows 72 is constructed out of a textile-reinforced rubber.

Figure 3:
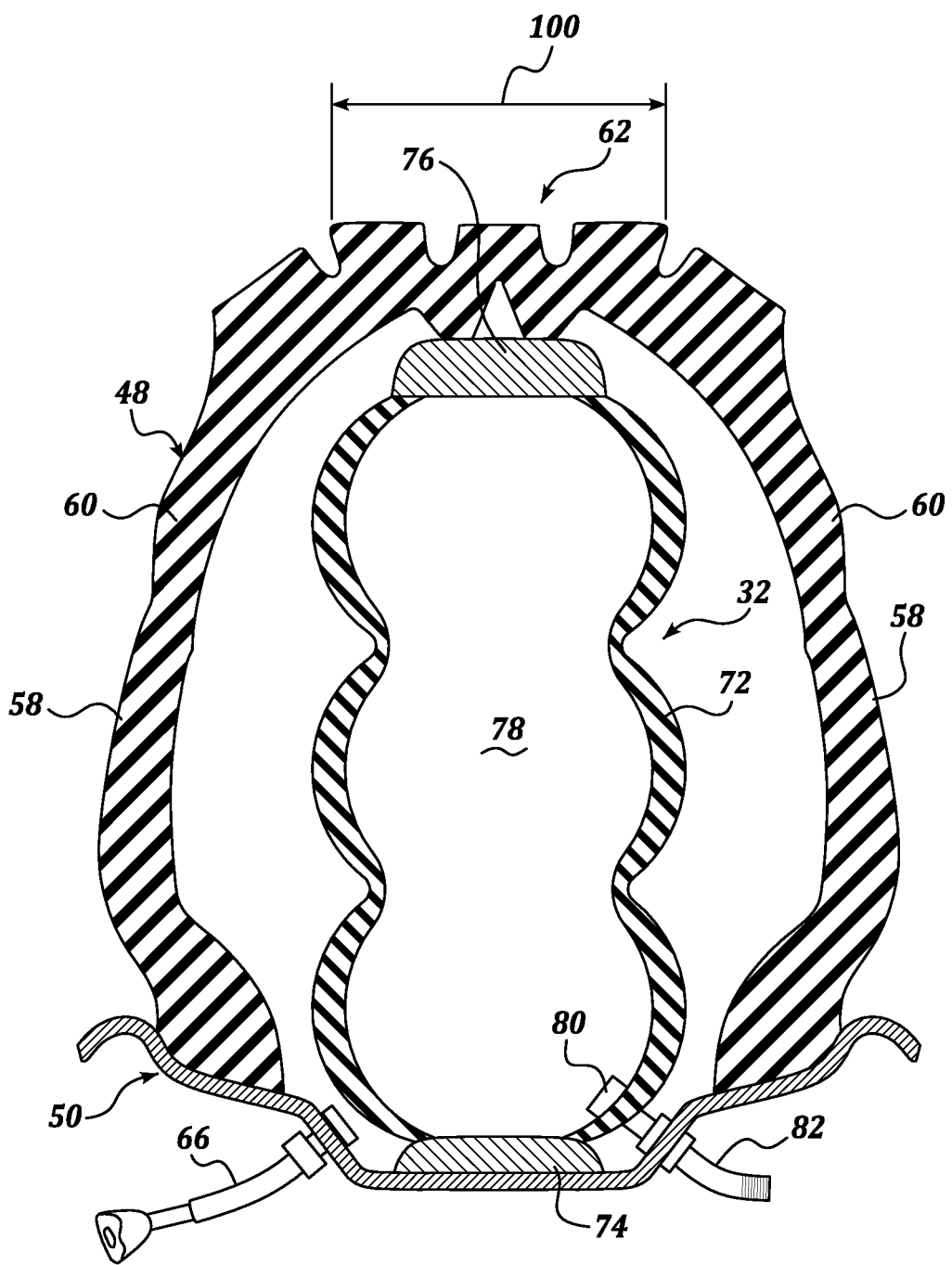
FIG. 3 is a cross sectional view of a tire and hub combination incorporating components of the fuel efficient system of FIG. 1, the tire and hub combination in a system activated state.

An inflation/deflation port 80 is provided in gas communication with the gas sealed cavity 78 of the bellows 72. In the embodiment shown, the port 80 is formed by an air fitting 82 that extends through the rim 50 and one wall or plate of the bellows 72. The port 80 is connected to the inflation/deflation control unit 34 via suitable supply lines 84, etc. In the embodiment shown in FIGS. 2 and 3, the port 80 is connected in gas communication with the compressed gas tank 28 via valve arrangement 36, and supply lines 84 and 86. While one port 80 is shown in the embodiment of FIGS. 2 and 3, it will be appreciated that multiple ports may be circumferentially positioned around the rim 50 of each wheel in a spaced apart manner and interconnected via any suitable arrangement of a distribution manifold or diverter, supply lines, and other optional components, etc. It will be appreciated that the number and size of the ports can be selected in order to affect the inflation/deflation rate of the bellows 72.

In one embodiment, the valve arrangement 38 is operably connected in-between the port 80 of each wheel and the compressed gas tank 28 for controlling or regulating the timing and/or quantity of pressurized gas routed to the bellows 72. The valve arrangement 160 may include one or more valves, including electrically controllable valves, such as solenoid valves, etc., one or more mechanically controllable valves (e.g., pressure controlled, etc.), and associated components for controlling or regulating the flow of compressed gas from the compressed gas tank 28 to the bellows 72. Additionally, the valve arrangement 38 may include one or more valves, including one or more electrically controllable valves or mechanically controllable valves, and any associated components for controlling or regulating the flow of compressed gas from the bellows 72 to atmosphere.

Figure 4:
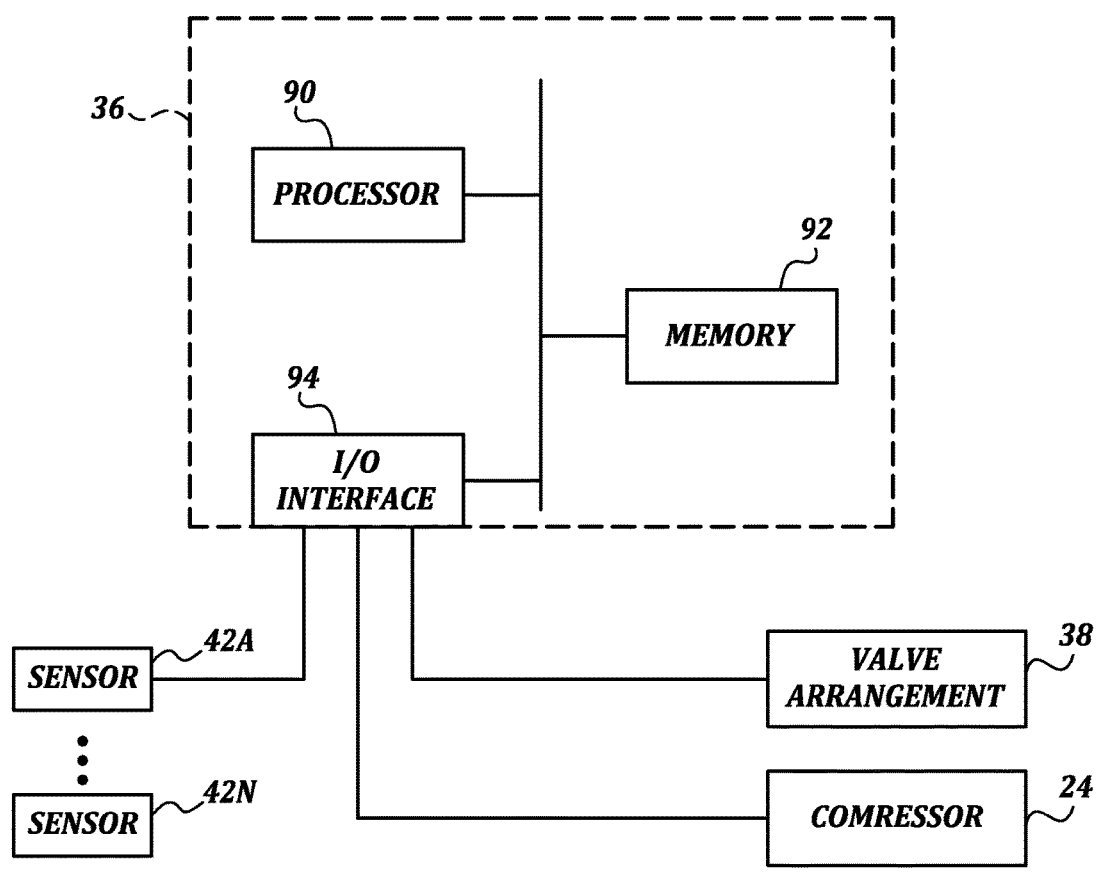
FIG. 4 is a schematic diagram of one example of a controller in accordance with aspects of the present disclosure.

As was described above, the valve arrangement 38 may be electrically controlled by the controller 36, one embodiment of which is shown schematically in FIG. 4. The controller 36 is connected in electrical communication with the valve arrangement 38 and other components, for example, one or more sensors 42A-N, as will be described in detail below. The controller 36 may include logic for controlling the inflation/deflation of the bellows 72. It will be appreciated by one skilled in the art that the logic may be implemented in a variety of configurations, including but not limited to, hardware, software, and combinations thereof.

In some embodiments, the controller 36 includes a processor 90 and memory 92, as shown in FIG. 4. The memory 92 may include computer readable storage media having volatile and nonvolatile storage in read-only memory (ROM), random-access memory (RAM), and keep-alive memory (KAM), for example. The KAM may be used to store various operating variables while the processor 84 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data. The data includes executable instructions, used by processor 90, in controlling the operation of the valve arrangement 38. In other embodiments, some of the data may represent executable instructions, used by processor 90, to control the operation of the compressor 24 and/or other controllable components of the system.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. In one embodiment, the processor 84 executes instructions stored in memory 86 to provide suitable control signals to the controllable valves of the valve arrangement and to selectively supply power to compressor or to other device level circuitry.

Still referring to FIG. 4, the processor 90 communicates with various sensors 42A-N directly or indirectly via an input/output (I/O) interface 94 and suitable communication links. The I/O interface may include conventional buffers, drivers, relays and the like, for sending device appropriate signals to the valves of the valve arrangement 38, to the compressor 24, etc. In doing so, the interface 94 may be implemented as a single integrated interface that provides various raw data or signal conditioning, processing, and/or conversion, short-circuit protection, and/or the like. Alternatively, one or more dedicated hardware or firmware chips may be used to condition and process particular signals before being supplied to the processor 90. In some embodiments, the signals transmitted from the interface 94 may be suitable digital or analog signals for controlling a switching device of the valves, compressor, etc. In other embodiments, the signals transmitted from the interface 94 may be suitable voltages to directly control the valves, compressor, etc.

The controller 36 may be a designated controller of the system 20 or may be part of another on-board controller, such as an engine control module (ECM). The controller 36 may also be connected to other vehicle controllers via a CAN 96. In some embodiments, the controller 36 may receive data from the sensors 42A-42N via the CAN 96. Embodiments of the CAN 96 may be implemented using any number of different communication protocols such as, but not limited to, Society of Automotive Engineer's ("SAE") J1587, SAE J1922, SAE J1939, SAE J1708, and combinations thereof.

In accordance with aspects of the present disclosure, sensors 42A-N may be used to provide various functionality to the system 20. In that regard, the one or more sensors 42A-N may include, for example, a gas pressure sensor for sensing the pressure of the pressurized gas in tank 28. Accordingly, the controller 36 can be programmed to determine whether the compressed gas tank 28 is in need of filling by operation of the compressor 24 via output of the gas pressure sensor.

The one or more sensors 42A-N may also include a sensor configured to output a signal indicative of vehicle speed. Such a sensor may include an engine speed sensor for sensing engine speed, a wheel speed sensor for sensing the speed of the vehicle wheels, a drive shaft speed sensor for sensing the speed of drive shaft of the vehicle, or combinations thereof, etc. The information from one or more of these sensors and/or others may be utilized by the controller 36 to control the operation of the valve arrangement 38. For example, the controller 36 may be programmed to control the valve arrangement 38 in order to supply pressurized gas to the bellows 72 when, for example, the operator activates the on/off switch 40 to the "on" position and the vehicle has reached a minimum threshold speed (e.g., 45 mph) as indicated by the one or more sensors 42. The controller 36 may also be programmed to operate the valve arrangement 38 to terminate the supply of pressurized gas to the bellows 72 when, for example, the one or more sensors 42 indicate that the vehicle has reached a maximum threshold speed (e.g., 75 mph or greater).

In another embodiment of the system 20, one of the sensors 42A-N may include a brake sensor for sensing the application of brakes. In this embodiment, the controller 36 is configured to purge or "dump" the pressurized gas within the bellows 72 to atmosphere when the brakes of the vehicle 100 are applied so as to return the shape of the ground contact patch to its "normal" state. In these and other embodiments, the controller 36 is configured to operate the valve arrangement 38 to purge or "dump" the compressed gas within the bellows 72 to atmosphere when the controller determines, via output from one or more of the sensors 42, that the vehicle's speed is below or rapidly approaching (i.e., decelerating) the minimum threshold value. It will be appreciated that other ways in which the system 20 may be controlled will readily be apparent to those skilled in the art. For example, additionally or alternatively, the controller 36 can be configured to purge or "dump" the compressed gas from the bellows 72 if the vehicle experiences excessive vehicle roll or yaw. In that regard, the one or more sensors may include vehicle yaw sensors and/or vehicle roll sensors. Excessive vehicle roll or yaw as used herein means an amount or degree of yaw or roll which would cause vehicle instability when the system is activated.

One method of operating the system 20 will be described with reference to FIGS. 1-3. During forward movement of a vehicle equipped with the system 20, a driver may wish to activate the system 20 in order to realized better fuel efficiency. In that regard, the operator may push or otherwise turn the on/off switch 40 to the "on" position. Once activated, the controller 36 monitors the one or more sensors 42A-42N for data indicative of the vehicle's speed. If it is determined by the controller 36 that the vehicle has attained the minimum threshold speed, the controller 36 transmits suitable control signals to the valve arrangement 38 in order to supply pressurized gas of a suitable pressure from the compressed gas tank 28 to the actuators 32 associated with each wheel. In doing so, the pressurized gas travels through the supply lines to the bellows 72 via each port 80. As the pressurized gas enters the bellows, the bellows 72 inflates and expands in a length-wise direction. As it expands, the plates 74 and 76 of the bellows 72 apply opposite forces against the rim 50 of the wheel and the tread 62 of the tire, thereby elongating the effective length of the tire side walls 58 and reducing the ground contact patch 68 of the tires to the "system activated" contact patch 100, as shown in FIG. 3. The system activated contact patch is less than half of the ground contact patch 68 in one embodiment.

It will be appreciated that the systems described herein are capable of continual use throughout the life of the vehicle although it may require routine maintenance or repair. It will be appreciated that the systems described herein can be installed at the time of vehicle manufacture or can be retrofitting on existing vehicles. Once one of the systems described herein is installed in the vehicle, the system can continue to be used after the tires have reached their useful life. In that regard, the system in some embodiments allows simple removal of the old tire(s) and installation of the new tire(s).

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," "secured," "mounted" and variations thereof herein are used broadly and encompass direct and indirect connections, couplings, securements and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A system for improving the fuel efficiency of a vehicle, comprising:
   at least one wheel comprised of a tire mounted to a rim and forming an inner cavity, the tire having sidewalls that extend outwardly from the rim to shoulders that are interconnected via a tread at a crown area of the tire;
   a linear actuator including a bellows, wherein the bellows includes reinforcement means for causing the bellows to extend primarily in the lengthwise direction, the linear actuator positioned within the inner cavity of the tire and configured to apply opposite forces against the tire and the rim as the linear actuator actuates from a tire normal state to a tire extended state, wherein the linear actuator contacts both the rim at one end and the tire at the other end as the linear actuator extends from the tire normal state to the tire extended state;
   a power storage source configured to store power, the power storage source selectively connected to the linear actuator, wherein the power storage source includes a compressed gas tank; and
   a controller configured to selectively supply power from the power storage source to the linear actuator in order to extend the linear so as to lengthen the side walls of the tire from the tire normal state, in which a section of the tread forms a ground contact patch, to the tire extended state, in which a subsection of the section of the tread forms a system activated contact patch, in order to reduce the amount of tread that contacts the ground.

2. The system of claim 1, further comprising a valve arrangement comprised of one or more controllable valves, the valve arrangement disposed in gas communication between the compressed gas tank and the bellows, wherein the one or more controllable valves are configured to selectively supply pressurized gas from the compressed gas tank to the bellows based on control signals from the controller.

3. The system of claim 2, wherein the one or more controllable valves are configured to selectively discharge pressurized gas from the bellows to atmosphere based on control signals from the controller.

4. The system of claim 2, wherein the one or more controllable valves are configured to be either manually or electrically controlled.

5. The system of claim 3, further comprising at least one sensor connected in communication with the controller, the at least one sensor configured to generate a signal, wherein the controller is configured to control the valve arrangement in response to the signal generated by the at least one sensor.

6. The system of claim 5, wherein the at least one sensor is selected from a group consisting of a speed sensor, a brake sensor, an accelerometer, a vehicle yaw sensor, and a vehicle roll sensor.

7. The system of claim 5, wherein the at least one sensor is configured to generate a signal indicative of vehicle speed and wherein the controller is configured to control the valve arrangement in response to the at least one sensor indicating a vehicle speed greater than a threshold minimum value.

8. The system of claim 5, wherein the at least one sensor is configured to generate a signal indicative of vehicle speed and wherein the controller is configured to control the valve arrangement in response to the at least one sensor indicating one of a vehicle speed greater than a minimum threshold value but less than a maximum threshold value, a vehicle speed less than a minimum threshold value, or a vehicle speed greater than a threshold minimum value.

9. The system of claim 8, wherein the controller is configured to control the valve arrangement in order to discharge gas from the bellows in response to the at least one sensor indicating a vehicle speed is below the minimum threshold value.

10. The system of claim 8, wherein the controller is configured to control the valve arrangement in order to supply gas to the bellows in response to the at least one sensor indicating a vehicle speed above the minimum threshold value.

11. The system of claim 3, further comprising at least one sensor connected in communication with the controller, wherein the at least one sensor includes a brake sensor configured to generate a signal indicative of brake system activation, and wherein the controller is configured to control the valve arrangement in order to discharge gas from the bellows in response to the brake sensor indicating brake system activation.

12. A system for improving the fuel efficiency of a vehicle, comprising:
   a wheel comprised of a tire mounted to a rim and forming an inner cavity, the tire having sidewalls that extend outwardly from the rim to shoulders that are interconnected via a tread at a crown area of the tire;
   a linear actuator positioned within the inner cavity of the tire such that the linear actuator contacts the rim at one end and the section of the tire adjacent the tread at the other end, wherein the linear actuator is configured to apply opposite forces again the tire and the rim primarily in the radial direction of the wheel as the linear actuator actuates from a tire normal state to a tire extended state;

a power storage source configured to store power, the power storage source selectively connected to the linear actuator; and a controller configured to selectively supply power from the power storage source to the linear actuator in response to signals from one or more sensors in order to transition the linear actuator from the tire normal state to the tire extended state, wherein the transition from the tire normal state to the tire extended state of the linear actuator lengthens the side walls of the tire and reduces the amount of tread that contacts the ground.

13. The system of claim 12, wherein the reduction of tread that contacts the ground is greater than 50% of the tread contact when the actuator is in the normal state.

14. The system of claim 12, wherein the power storage source is a compressed gas tank, and wherein the linear actuator includes a bellows having reinforcement means for causing the bellows to extend primarily in the lengthwise direction.

15. The system of claim 14, further comprising a valve arrangement comprised of one or more controllable valves, the valve arrangement disposed in gas communication between the compressed gas tank and the bellows, wherein the one or more controllable valves are configured to selectively supply pressurized gas from the compressed gas tank to the bellows based on control signals from the controller.

16. The system of claim 15, wherein the one or more controllable valves are configured to selectively discharge pressurized gas from the bellows to atmosphere based on control signals from the controller.

17. The system of claim 16, wherein the controller is configured to operate the valve arrangement to:

supply pressurized gas to the bellows in response to sensor signals indicative of vehicle speed greater than 45 miles per hour; and discharge pressurized gas to the bellows in response to sensor signals indicative of vehicle speed less than 45 miles per hour or brake system activation.

* * * * *

UNITED STATES PATENT AND TRADEMARK OFFICE
CERTIFICATE OF CORRECTION

PATENT NO. : 9,944,126 B2  
APPLICATION NO. : 14/605743  
DATED : April 17, 2018  
INVENTOR(S) : R. B. Wood Page 1 of 1

It is certified that error appears in the above-identified patent and that said Letters Patent is hereby corrected as shown below:

| Column | Line | Error |
|---|---|---|
| 9 (Claim 12, Line 11) | 1 | "apply opposite forces again" should read --apply opposite forces against-- |

Signed and Sealed this  
Tenth Day of July, 2018

Andrei Iancu  
*Director of the United States Patent and Trademark Office*